K. BURKHEISER.
PROCESS OF OBTAINING AMMONIUM SALTS FROM GAS.
APPLICATION FILED OCT. 7, 1908.
973,164.
Patented Oct. 18, 1910.
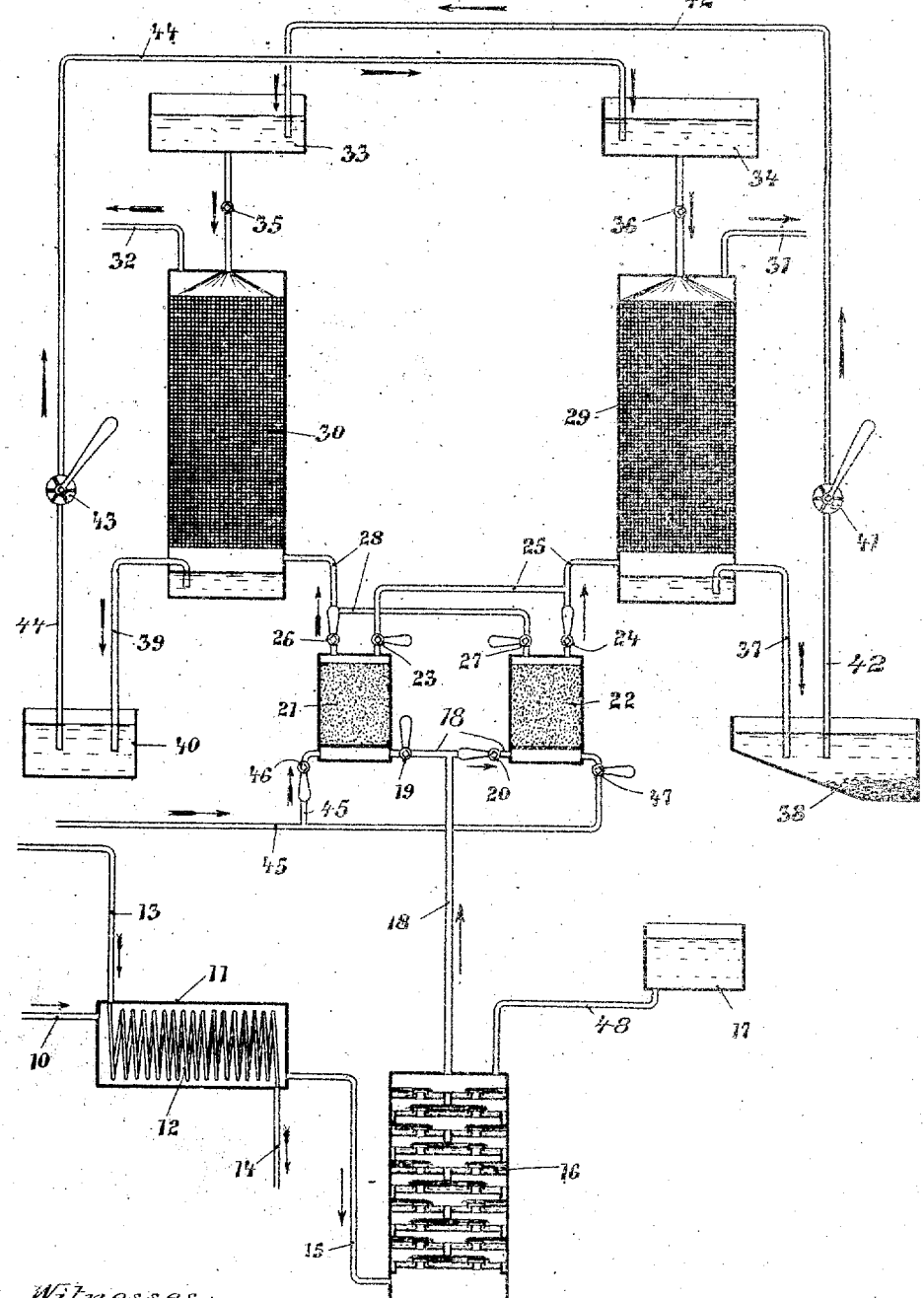
Witnesses:
Arthur E. Zumpe.
W. R. Schulz.
Inventor:
Karl Burkheiser
by Frank V. Briesen Atty.

UNITED STATES PATENT OFFICE.

KARL BURKHEISER, OF AIX-LA-CHAPELLE, GERMANY.

PROCESS OF OBTAINING AMMONIUM SALTS FROM GAS.

973,164.  Specification of Letters Patent.  Patented Oct. 18, 1910.

Application filed October 7, 1908. Serial No. 456,668.

*To all whom it may concern:*

Be it known that I, KARL BURKHEISER, a subject of the German Emperor, residing at Aix-la-Chapelle, Germany, have invented new and useful Improvements in Processes of Obtaining Ammonium Salts from Gas, of which the following is a specification.

This invention relates to a process of obtaining ammonium salts from gases, such as illuminating gas or coke oven gas, in a simple and economical manner. For this purpose the sulfur and ammonia contained in the gas are caused to so interact as to directly produce ammonium sulfite or ammonium sulfate.

In carrying out my process, the gas is passed over a substance which is capable of giving off oxygen, such as roasted bog iron ore, said substance being heated to a temperature at which condensation of the water contained in the gas, is prevented, said temperature being under normal conditions 60–70° C. The oxidizing substance is either continuously regenerated by adding air or pure oxygen to the gas passing thereover, or it is intermittently regenerated by passing alternately gas and air currents over said substance. If the oxidizing substance is continuously regenerated and heated to the temperature of oxidizing sulfureted hydrogen, the latter is decomposed into sulfurous acid and water, while at higher temperatures and with a sufficient supply of oxygen, sulfuric anhydrid is formed. If, however, the oxidizing substance is intermittently regenerated, there occurs first an oxidation to sulfur compounds which are subsequently higher oxidized when oxygen is passed over said compounds. The sulfur dioxid or sulfur trioxid reacts on the ammonia contained in the gas with which it will form acid or neutral sulfite or sulfate of ammonia. The reactions taking place with a continuous regeneration of the oxidizing substance yield, in the first case, an acid salt, while, in the second case, a neutral salt is obtained, owing to the combination of twice the quantity of ammonia with the same quantity of sulfurous acid, the reactions being as follows:

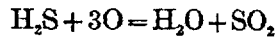

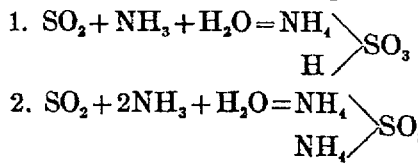

For illustrating the reactions that take place when intermittently regenerating, it may be assumed that oxid of iron be used as oxidizing agent. During the first step the sulfureted hydrogen combines therewith, while during the second step the oxidizing substance is regenerated and the sulfur oxygen compound is formed according to the following formula:

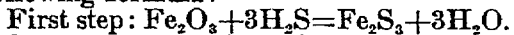
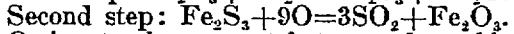

Owing to the contact between the sulfur oxygen compounds thus formed and the ammonia, the above described reactions will either yield an acid salt or a neutral salt according to the quantity of ammonia present.

The accompanying drawing illustrates a diagrammatic elevation of a plant for carrying out my process.

The numeral 10 indicates a gas duct connected to the ovens or tar separators, (not shown), and opening into a chamber 11 which is heated by pipe coil 12. The latter communicates by pipe 13 with a suitable steam supply, the steam being discharged from coil 12 through pipe 14. Chamber 11 is, by duct 15, connected with a suitable distilling apparatus 16 which is, at its top, supplied with ammoniacal liquor discharged from tank 17 through pipe 48. Still 16 is, by pipe 18, connected to a pair of oxidizing chambers 21, 22, communication therewith being controlled by cocks 19, 20, respectively. Chambers 21, 22 contain a suitable oxidizing substance, such as roasted bog iron ore, and are, by pipe 25, connected with a suitable washing apparatus 29, communication therewith being controlled by cocks 23 and 24.

In like manner, chambers 21, 22 communicate by pipe 28, controlled by cocks 26, 27, respectively, with a washing apparatus 30. Washers 29, 30 are made in the form of towers containing coke, twigs or similar material, and are provided with upper discharge pipes 31, 32 of which pipe 31 is connected to the gas mains (not shown) while pipe 32 opens into the atmosphere. Above towers 29, 30, are arranged tanks 33, 34, communication therewith being controlled by cocks 35, 36, respectively. The liquor collecting at the bottom of towers 29, 30 is, by pipes 37, 39 conveyed to basins 38, 40, respectively. Basin 38 is, by pipe 42, connected to tank 33, a pump 41 being employed for raising the liquor from the basin into the tank. In like manner, basin 40 is, by pipe 44, and pump 43, connected to tank 34. An air pipe 45 opens into chambers 21, 22, communication therewith being controlled by cocks 46, 47.

The process is as follows: The raw gas is preferably cooled to effect the separation of tar. The aqueous condensate formed thereby contains a large quantity of ammonia, said condensate being continuously conveyed into tank 17, from which it flows into the distilling apparatus 16. The raw gas which contains sulfureted hydrogen and that portion of the ammonia which has not been precipitated during the cooling of the gas, enters heater 11 through pipe 10, from whence it is conveyed, through pipe 15, into distilling apparatus 16. In the latter the rising hot gas encounters the descending gas water and takes up its ammonia. In order to separate the ammonia, which has already been bound to acids, the distilling apparatus may contain lime or some other basic substance. During the process described, the gas current again takes up the ammonia precipitated with the gas water and is heated to such a degree as is necessary for heating the oxidizing substance. It may here be stated, that when adapting old plants to my improved process, in which plants the entire quantity of ammonia is separated by washing the gas, and in which, consequently, the gas water contains all of the ammonia, the gas entering through pipe 10 carries only sulfureted hydrogen. The gas leaving still 16 is then conveyed to oxidizing chamber 22, cock 19 being closed and cock 20 opened. In this chamber the sulfureted hydrogen is separated in the form of sulfur compounds or sulfur iron compounds, while the gas carrying the ammonia enters through open cock 24 into washing apparatus 29. The temperature, which should be maintained in chamber 22 by the inflowing gas, depends upon the amount of moisture carried thereby and should be preferably between 60° and 70° centigrade, so as to avoid the formation of condensates upon the bog iron ore.

Attention may be called to the fact, that the process may also be carried out at atmospheric temperature, but a temperature higher than 120° centigrade should be avoided, because, in that case the sulfur melts and thus is apt to be readily taken along by the gas. The temperature which the oxidizing agent should have cannot be fixed, as said temperature changes constantly according to the center of reaction, and as furthermore, there occurs at this place a generation of heat owing to the strong exothermic reaction.

While the process described is going on, valve 47 is closed, while valve 46 is opened, so that an air current, passing through pipe 45, enters chamber 21. This current regenerates the oxidizing substance and simultaneously oxidizes the compounds of sulfur or sulfur iron, thereby forming sulfurous acid. The air carrying the latter enters washing apparatus 30 and escapes through pipe 32 into the atmosphere, during which process cock 27 is closed, while valve 26 is opened. In washing apparatus 30, which is rinsed with the liquor leaving tank 33, the sulfurous acid is retained; the liquor formed flowing through pipe 39 into basin 40. From the latter the liquor is, by pipe 44 and pump 43, conveyed to tank 34, to be discharged into washing apparatus 29. As the latter is traversed by gas carrying ammonia, the washing of said gas is accompanied by a combination of the ammonia contained in the gas with the sulfurous acid contained in the washing liquor, thereby forming a salt. As said liquor is present in excess within tower 29, the salt thus formed is dissolved in the liquor and flows with the latter into basin 38. From this basin the salt solution is, by pipe 42 and pump 41, returned to tank 33, so that it will again become saturated with sulfurous acid and so on.

The advantage of my improved process consists in the fact that the gas, as well as the air, after leaving the oxidizing chamber, are alternately brought into contact with the same washing liquor, and that the latter brings about the reaction between the ammonia and the acid previously formed, without permitting the carriers of the ammonia and acid, i. e., the gas and the air, to come into contact with one another. In this way the liquor effecting the above reaction is gradually enriched with thioammonium salts, until it is saturated therewith, thereby avoiding the presence of an excess of free acid or free ammonia. The slight excess of one substance at each stage of the process, however, renders the washing liquor well adapted for absorbing the other substance, as such liquor has a greater tendency than pure water for absorbing the ammonia or sulfurous acid. The resulting salt collects at the bottom of basin 38 from which it may be removed from time to time.

After the oxidizing substance contained within chamber 22, has been exhausted, all cocks are reversed, so that the gas will now flow through chamber 21 into tower 29, while the air passes through chamber 22 into tower 30, thus permitting a continuation of the process without interruption. If the amount of sulfureted hydrogen is excessive, part of the air charged with acid, while passing the oxidizing chamber, may be branched off before entering the washing tower. This separated air carrying acid may either be discharged into the atmosphere, or may be utilized for other purposes. For that part of the air which is thus withdrawn, the oxidizing chamber acts merely as a purifier. If there should occur a deficiency of acid, suitable acids may be added to the washing liquor.

In lieu of treating the precipitated gas water with the raw gas, the regenerating air may be utilized for this purpose. In this case, air is admitted through pipe 10, while the gas enters through pipe 45. When the air, that now constitutes the ammonia carrier, passes the oxidizing chamber, there occurs simultaneously with the regeneration of the oxidizing agent, the formation of thioammonium salts owing to the presence of acid. These salts, together with the excess of free acid, will be taken up by the washing liquor. If my process is to be carried out in an old plant, in which all the ammonia is contained in the gas water, the air may be charged with the entire quantity of ammonia, so that the raw gas constitutes a carrier for sulfureted hydrogen only.

Generally it will not be necessary to conduct the entire quantity of air through the distilling apparatus 16, so that part thereof may be branched off after it has passed the heating chamber to be directly conveyed to pipe 18.

I claim:

1. Process of obtaining ammonium salts from gas containing sulfureted hydrogen and ammonia, which consists in converting the sulfureted hydrogen into sulfur oxygen compounds by contact with an oxidizing agent, causing said compounds to react with the ammonia contained in the gas, and regenerating the oxidizing agent by passing an air current thereover.

2. Process of obtaining ammonium salts from gas containing sulfureted hydrogen and ammonia, which consists in passing the gas over an oxidizing agent to retain the sulfureted hydrogen in the form of sulfur compounds, regenerating the agent and converting the sulfur compounds into acid anhydrid by passing an air current over said agent, and separately washing the gas carrying the ammonia and the air carrying the acid with the same liquid, to retain the ammonia and the acid anhydrid and cause a reaction between these gases.

3. Process of obtaining ammonium salts from gas containing sulfureted hydrogen and ammonia, which consists in passing the gas over an oxidizing agent in a plurality of alternately traversed contact chambers, to retain the sulfureted hydrogen in the form of sulfur compounds, passing a current of air through those chambers which were previously traversed by the gas, to regenerate the oxidizing agent and to convert the sulfur compounds into acid anhydrid, washing the gas carrying the ammonia and the air carrying the acid in different washers with the same liquid to retain the ammonia and the sulfurous acid and cause a reaction between these gases, said washing liquid flowing in a continuous cycle through all the washers.

4. Process of obtaining ammonium salts from gas containing sulfureted hydrogen and ammonia, which consists in cooling said mixture to precipitate ammoniacal liquor, heating said liquor in the presence of a current of air adapted to absorb the ammonia therefrom, converting the sulfureted hydrogen of the residual gas into acid anhydrid by contact with an oxidizing agent, whereby the sulfureted hydrogen is retained in the form of sulfur compounds, passing the air carrying the ammonia over said agent to regenerate the same and to convert the sulfur compounds into acid anhydrid, separately washing the gas carrying the ammonia and the air carrying the acid with the same liquid to retain the ammonia and the sulfurous acid and cause a reaction between these gases.

In witness whereof I have signed this specification in the presence of two witnesses.

KARL BURKHEISER.

Witnesses:
HENRY QUADFLIEG,
WILLIAM J. REUTERS.